United States Patent [19]

Amino

[11] 4,159,907
[45] Jul. 3, 1979

[54] METHOD FOR MELTING ALUMINUM SCRAPS

[75] Inventor: Kunio Amino, Tokyo, Japan

[73] Assignee: Amino Aluminium Industries, Co., Ltd., Tokyo, Japan

[21] Appl. No.: 863,051

[22] Filed: Dec. 21, 1977

[30] Foreign Application Priority Data

Dec. 23, 1976 [JP] Japan .................. 51-154223

[51] Int. Cl.² ........................... C22B 21/00
[52] U.S. Cl. .................. 75/68 R; 75/44 S; 75/65 R
[58] Field of Search ........... 75/68 R, 65 R, 44 S, 75/65; 266/901

[56] References Cited

U.S. PATENT DOCUMENTS 3,935,003  1/1976  Steinke et al. .............. 75/68 R
4,036,441  7/1977  Basten et al. ............... 75/44 S

FOREIGN PATENT DOCUMENTS 540105  10/1941  United Kingdom ............ 75/65 R

*Primary Examiner*—M. J. Andrews
*Attorney, Agent, or Firm*—Oblon, Fisher, Spivak, McClelland & Maier

[57] ABSTRACT

Economically advantageous melting of aluminum scraps is obtained by first compressing said aluminum scraps under a magnitude of pressure exceeding the yield strength of the material making up said scraps for thereby converting them into a compressed mass having an apparent specific gravity greater than the specific gravity of normal aluminum melt and subsequently introducing the compressed mass into a molten aluminum bath.

4 Claims, 5 Drawing Figures

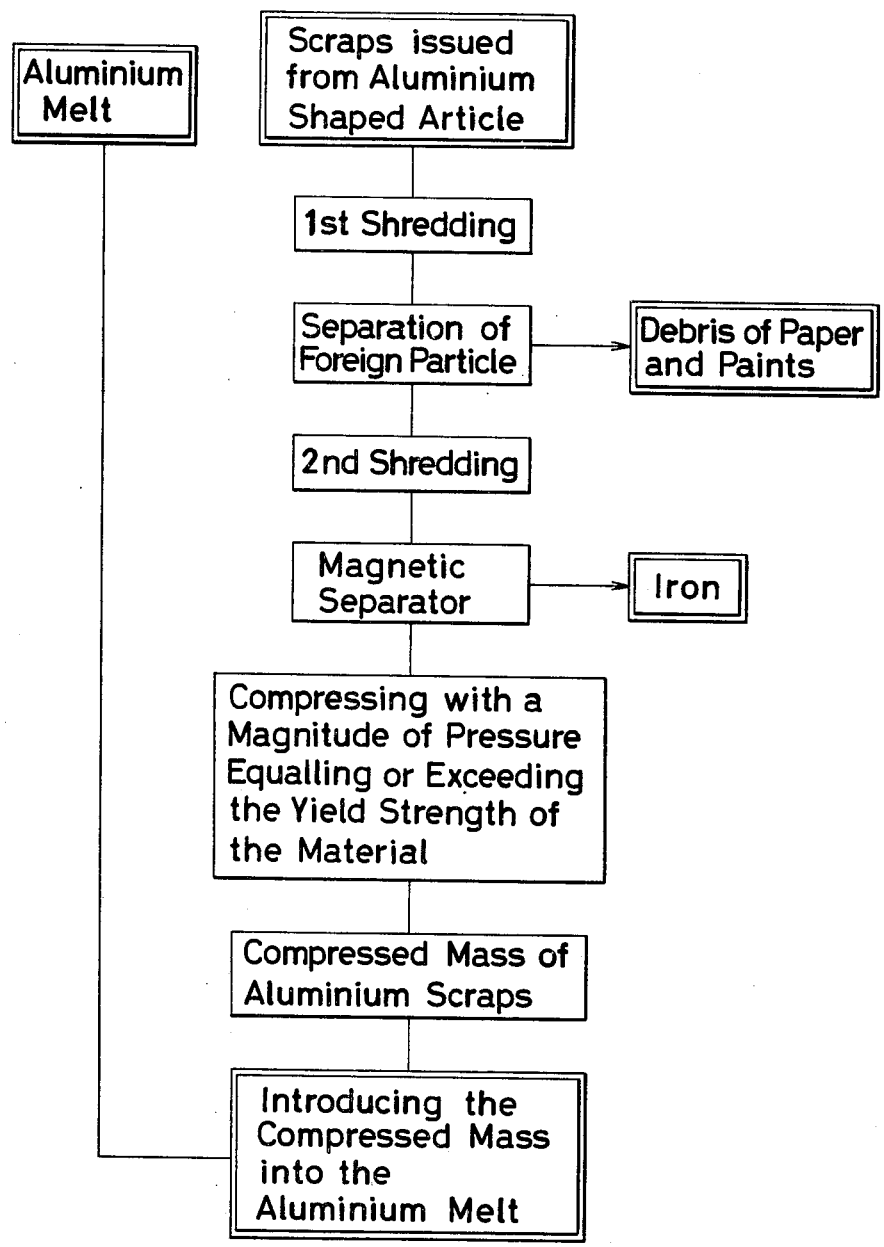

METHOD FOR MELTING ALUMINUM SCRAPS

BACKGROUND OF THE INVENTION

This invention relates to a method for advantageously melting aluminum scraps in a freshly molten aluminum mass (hereinafter referred to as "molten bath") for the purpose of reutilization of the aluminum contained in the scraps. The term "aluminum scraps" as used in this specification is meant to embrace both scraps of aluminum and scraps of aluminum alloys.

In the melting of aluminum scraps in the molten bath, it is extremely important from the economic point of view to minimize possible loss of aluminum due to melting.

The melting of aluminum scraps is usually performed in the atmosphere. The temperature of the molten bath is very high, generally exceeding 660° C., and frequently ranging from 720° C. to 780° C. When aluminum scraps are introduced into the molten bath at such high temperatures, they are liable to react with oxygen and nitrogen contained in the ambient air and produce aluminum oxide and aluminum nitride. These products are called "melt slag" and they are responsible for said melting loss. To minimize this melting loss, it is imperative that said reaction should be prevented from occurring, i.e. the aluminum scraps should be caused to sink under the molten bath as quickly as possible. For this purpose, there has actually been employed the liquid-heel process, the liquid-flux process or the method which comprises pressing and immersing scraps into the molten bath.

The liquid-heel process comprises the steps of depositing aluminum scraps on the surface of the molten bath and subsequently forcing these aluminum scraps into the interior of the bath. This forced submersion of aluminum scraps is effected by a manual method or a mechanical method. Specifically, the manual method effects the forced submersion of aluminum scraps by causing the scraps floating on the surface of the molten bath to be pushed down into the interior of molten bath by use of a rabbler which consists of an iron bar and a disc or square of iron plate attached at an angle to the forward end of said iron bar. This operation entails immense labor and is the most physically taxing job involved in any kind of melting operation. The mechanical method generally employs bladed puddlers in the case of iron-hot furnaces or grid puddlers in the case of hearth furnaces of various types. These two methods both aim to prevent aluminum scraps from undergoing oxidation or nitrification by minimizing the duration of exposure of such aluminum scraps to the ambient air while they are floating on the surface of molten bath. These methods, however, are such that they cause the aluminum scraps to undergo oxidation and nitrification to a considerable extent. Thus, they suffer from the heaviest melting loss of all the types of melting methods.

The liquid-flux process accomplishes desired melting of aluminum scraps by introducing said scraps in a mass of flux melted in advance. A typical flux to be used for this purpose consists of 50 to 70% by weight of NaCl, 25 to 45% by weight of KCl, 3 to 10% by weight of $CaF_2$, etc. for example. In the case of this composition, the flux is melted and kept at temperatures in the range of from 720° C. to 780° C. when the aluminum scraps are introduced. This method entails very little melting loss because the aluminum scraps are melted immediately after their entry into the molten flux. In this method, however, since the molten flux absorbs oxides and consequently becomes viscous and deteriorated, the melting operation requires 200 to 300 kg of molten flux per ton of aluminum scraps placed therein. The cost of melting by this method, therefore, is quite high.

New clippings and solids of pure aluminum (as defined by the United States NASMI Standards for Nonferrous Metal Scraps) have large surface areas and small bulk densities for the unit weight and, therefore, are quite liable to undergo oxidation and nitrification upon exposure to the ambient air. To cope with the difficulty, there has been adopted a method for decreasing their apparent surface areas per unit weight by pressing the clippings and solids generally under a pressure of 30 $kg/cm^2$. This pressing indeed increases their bulk densities whose initial values are usually on the order of from 0.28 to 0.48. Actually, however, they are increased by 1.6 times at most.

An object of the present invention is to provide a method for advantageous melting of aluminum scraps, which method neither requires use of any flux nor necessitates forced submersion of floating scraps into the interior of the molten bath but is applicable generally to all types of aluminum scraps and suffers from less melting loss than any other methods directed to the same purpose heretofore put to actual use.

BRIEF SUMMARY OF THE INVENTION

With a view to fulfulling the object described above, the inventors made a study in search of a method which gives aluminum scraps a property such that the scraps immediately submerge under the molten bath when they are brought into contact with the molten bath. They have, consequently, developed a method whereby said immediate submersion of scraps is obtained by compressing the scraps under a magnitude of pressure greater than the yield strength of the material making up the scraps for thereby increasing the bulk density of said scraps so much as to equal or surpass the specific gravity of the molten bath. The present invention has originated in the development of this principle. To be more specific, extraneous particles are first removed from the aluminum scraps either after the scraps are first finely shredded into particles preferably having a fixed particle size distribution as in the case of scraps which issue from plates or shaped articles or without being further reduced in size as in the case of new clippings or solids of sufficiently small dimensions. Thereafter, the finely particulate aluminum scraps of either or both of the above described types are compressed under a magnitude of pressure greater than the yield strength of the material of which they are made and, thus, converted into a compressed mass having an increased bulk density as mentioned above. Finally, the compressed mass of scraps is introduced into the molten bath.

BRIEF EXPLANATION OF THE DRAWING

FIG. 3 is a diagram showing one typical process for working the present invention.

DETAILED DESCRIPTION OF THE INVENTION

The method conventionally adopted chiefly for the purpose of pressing aluminum scraps having a relatively large apparent surface area per unit weight such as new pure aluminum clippings and solids or aluminum foil scraps for thereby decreasing said apparent surface area of the scraps and then subjecting the pressed mass of scraps to melting will be described.

Figure 1:
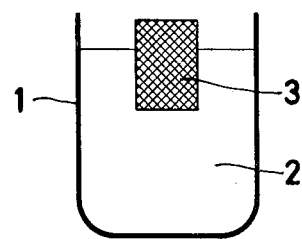
FIG. 1 and FIG. 2 are a schematic representation of the behavior of a mass of aluminum scraps pressed to decrease the apparent surface area of aluminum scraps and placed in the molten bath to be melted therein according to the conventional method of the prior art.
Figure 2:
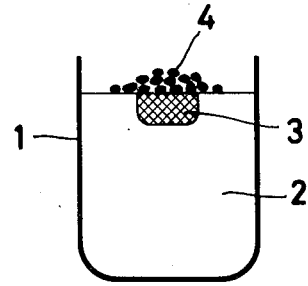

In this case, the intial apparent specific gravity of the aluminum scraps is about 0.48 and the apparent surface area of the scraps is decreased to about one half in consequence of the pressing performed under a pressure of about 30 kg/cm$^2$, for example. This means that the apparent specific gravity of the pressed mass of scraps is not more than 1.6. When the mass of scraps prepared by this method is placed in the molten bath to be melted therein, the behavior of the mass observed in the molten bath is as illustrated in FIGS. 1 and 2. In the drawing, 1 denotes a container, 2 a molten bath and 3 a mass of aluminum scraps.

The relation between temperature and specific gravity of pure aluminum is shown in the following table.

Table 1

| Temperature °C. | 25 | 660(S) | 660(L) | 700 | 720 | 750 | 800 |
|---|---|---|---|---|---|---|---|
| Specific gravity | 2.698 | 2.55 | 2.368 | 2.357 | 2.352 | 2.345 | 2.332 |

It is seen from the table that the specific gravity of the molten bath generally ranges from 2.33 to 2.37, though it is variable to some extent with the temperature.

When a mass of aluminum scraps is placed in the molten bath, therefore, it floats in the upper part of the molten bath, with a part thereof exposed to sight above the surface of the molten bath as illustrated in FIG. 1. FIG. 2 shows the subsequent behavior of the mass of aluminum scraps while it is in the process of melting. The mass of scraps 3 shown in FIG. 1 produces a partially disintegrated portion 4 while it remains floating on the surface of the molten bath. Hence it is inevitably susceptible to oxidation and nitrification. This is to say that the mass of scraps still suffers from melting loss to a considerable extent, although the pressing has served the purpose of decreasing the apparent surface area of scraps and, consequently, repressing possible melting loss discernibly. In the conventional method, scraps issuing from plates or shaped articles are thrown directly into the molten bath either as they are or after bein shredded into fragments of, for example, diameters from 300 to 500 mm. In this case, the apparent specific gravity of the fragments of scraps is generally about 0.28 and the melting yield is 93.7%. Whether the aluminum scraps are new pure aluminum clippings and solids or aluminum foil scraps or those issuing from shaped articles, the method inevitably entails appreciable melting loss.

In contrast, the method of the present invention effects the desired melting of aluminum scraps by first compressing the scraps under a magnitude of pressing greater than the yield strength of the material making up the scraps for thereby converting them into a compressed mass having an apparent specific gravity at least equalling and desirably exceeding the specific gravity of the molten bath, namely an apparent specific gravity of more than 2.3 and preferably more than 2.50 and subsequently introducing the compressed mass into the molten bath.

Now, a typical process for working the method of this invention will be described with reference to the flow diagram of FIG. 3.

FIG. 3 shows the process as being performed by using aluminum scraps issuing from shaped articles. In this case, the scraps are assumed to be shredded twice. They are subjected to the first shredding and then, after separation of foreign particles such as debris of paper and paints therefrom, are subjected to the second shredding, followed by magnetic separating which serves to remove iron pieces from the aluminum scraps. The extent of these shredding and separating operations are variable with the kind of aluminum scraps under treatment and the kind of extraneous particles contained in the scraps. At any rate, these operations are desired to be carried out to the extent of converting the scraps, by the end of the second shredding, into particles most (more than 80%) of which have maximum diameters of between 2 and 20 mm. The shredded particles of aluminum scraps obtained at the end of the second shredding are desired to have a particle size distribution to be described in further detail hereinafter. The particles of aluminum scraps thus prepared are subsequently compressed with a magnitude of pressure equalling or preferably exceeding the yield strength of the material making up the aluminum scraps. A double-action type hydraulic molding press or a withdrawal molding press, for example, can be used for the purpose of compressing the particles of aluminum scraps.

The yield strength of aluminum scraps is variable with the particular composition they possess. The relation between composition and physical properties of a typical aluminum and aluminum alloy (B209-74 according to ASTM) is shown in Table 2 below.

Table 2

| Alloy | Composition (wt %) (except Al) | | | | | Tensile strength kg/cm$^2$ (MPa) | Yield strength kg/cm$^2$ (MPa) | Elongation (%) |
|---|---|---|---|---|---|---|---|---|
| | Fe | Si | Cu | Mg | Mn | | | |
| 1  1100-0 | 1.0 | 0.05 | 0.20 | 0.05 | 0.05 | 775~1092 (76~107) | 245 (24)** | 28** |
| 2  1100-H14 | " | " | " | " | " | 1122~1480 (110~145) | 990 (97)** | 1~10 |
| 3  1100-H18 | " | " | " | " | " | 1551 (152)** | — | 1~4 |
| 4  3003-0 | 0.7 | 0.6 | " | " | 1.0 1.5 | 990~1337 (97~131) | 347 (34)** | 14~23 |
| 5  3003-H14 | " | " | " | " | " | 1408~1827 (138~179) | 1194 (117)** | 1~10 |

Table 2-continued

| Alloy | Composition (wt %) (except Al) | | | | | Tensile strength kg/cm² (MPa) | Yield strength kg/cm² (MPa) | Elongation (%) |
|---|---|---|---|---|---|---|---|---|
| | Fe | Si | Cu | Mg | Mn | | | |
| 6  3003-H18 | " | " | " | " | " | 1898 (186)** 1755~2184 | 1684 (165)** 673 | 1~4 |
| 7  5052-0 | 0.45* | 0.10 | 2.8 | * 2.2 | 0.10 | (172~214) | (66)** | 14~18 |
| 8  5052-H38 | " | " | " | " | " | 2745 (269)** | 2255 2255 | 2~4 |
| 9  2014-0 | 0.7* | 3.9 | 5.0 | 0.20 0.8 | 0.40 1.2 | 2255 (221)* | 1122 (110)* | 10~16 |
| 10  21014-T6 | " | " | " | " | " | 4500 (441)** | 4010 (393)** | 6** |

*maximum
**minimum

The foregoing process flow of the method of this invention has been described with reference to an operation involving the melting of aluminum scraps issuing from plates, shaped articles, etc. In case where the aluminum scraps happen to be new pure aluminum clippings and solids, aluminum foil scraps, etc., the object of this invention can fully be accomplished by separating them from extraneous particles and immediately, in their unshredded state, compressing the scraps under a magnitude of pressure greater than the yield strength of the material making up the scraps.

The relation of aluminum scraps with the pressure used for the compression and the compressed mass of aluminum scraps as obtained in experiments will be described.

Experiment 1

Method of experiment—Aluminum scraps were finely shredded and separated from extraneous particles to afford aluminum particles. The aluminum particles were compressed with a double-action type hydraulic molding press to produce a compressed mass. The relation between the kind of aluminum scraps, the magnitude of pressure used for the compression and the bulk density of the compressed mass is shown in Table 3.

The particle size distribution of the shredded particles of aluminum scraps also has some effect upon the force with which the compression is effected. To be specific, the specific gravity of the compressed mass of aluminum scraps can easily and quickly be increased so much as to equal or exceed that of the molten bath when the particle size distribution satisfies a prescribed requirement. In case where the particles have a substantially uniform coarse size, however, they are susceptible to the phenomenon of spring-back which renders the compression infeasible.

Desirably the shredded particles of aluminum scraps have a particle size distribution such that particles of the size groups indicated below are contained at percentages falling in the following respective ranges.

Particles measuring up to 2 mm: 3 to 7% by weight
Particles measuring from 2 mm to 20 mm: 88 to 92% by weight
Particles measuring 20 mm or over: 3 to 7% by weight

Experiment 2

An experiment similar to Experiment 1 was performed on new pure aluminum clippings and solids or

Table 3

| | Aluminum scraps as raw material | | |
|---|---|---|---|
| Kind | 1100 P | 5052 P | 6063 S |
| Composition (except Al) (wt %) | Fe+Si, Cu, Mn, Zn 1.0,0.05~0.20,0.05,0.10 | Si, Fe, Cu, Mn, Mg 0.08,0.10,0.10,0.10,2.5 | Si, Fe, Cu, Mn, Mg, Cr, Zn, Ti 0.5,0.35,0.10,0.10,0.55,0.10,0.10,0.10 |
| Distribution of particles diameter | | | |
| less than 2 mm | 5 wt % | 5 wt % | 5 wt % |
| 2mm ~20 mm | 90 wt % | 90 wt % | 90 wt % |
| more than 20 mm | 5 wt % | 5 wt % | 5 wt % |
| Bulk density | 0.82 | 0.817 | 0.914 |
| Yield strength | 1400 | 1700 | 1500 |
| After compression | | | |
| Pressure applied (kg/cm²) | 1670 | 1074 | 1240 |
| Bulk density | 2.42 | 2.33 | 2.22 |
| Pressure applied (kg/cm²) | 2148 | 1790 | 2864 |
| Bulk density | 2.61 | 2.56 | 2.34 |
| Pressure applied (kg/cm²) | 2864 | 2148 | 3222 |
| ulk density | 2.66 | 2.61 | 2.44 |

It is clear from Table 3 that the specific gravity of the compressed mass of aluminum scraps equals or exceeds that of the molten bath when the pressure applied is greater than the yield strength of the aluminum scraps under treatment.

aluminum foil scraps. The aluminum scraps were subjected, in their unshredded form, to compression immediately after removal of extraneous particles. The relation between the pressure used for the compression and the bulk density of the compressed mass is shown in Table 4.

Table 4

| | Aluminum scraps as raw material | |
| --- | --- | --- |
| Kind | 1060 | 1100 |
| Form | foil | new pure al clippings and solids |
| Composition (except Al) | Fe, Si, Cu, Mn, Zn, | Fe+Si, Cu, Mn, Zn |
| (wt %) | 0.35, 0.25, 0.05, 0.03, 0.03 | 1.0, 0.05~0.20, 0.05, 0.10 |
| Bulk density | 0.232 | 0.473 |
| Yield strength | 960 | 1400 |
| | After compression | |
| Pressure applied (kg/cm$^2$) | 1790 | 1790 |
| Bulk density | 2.33 | 1.90 |
| Pressure applied (kg/cm$^2$) | 2506 | 2864 |
| Bulk density | 2.42 | 2.32 |
| Pressure applied (kg/cm$^2$) | 2864 | 3222 |
| Bulk density | 2.59 | 2.48 |

The data of this table indicate that in the experiment, the compression performed under a magnitude of pressure greater than the yield strength of aluminum scraps increased the bulk density to more than 2.35 times the original value.

The greatest dimension of the compressed mass is desired to be not larger than 140 mm. If the compressed mass has a dimension greater than 140 mm, then the melting requires greater time. This is particularly true where the apparent specific gravity of compressed mass equals the specific gravity of the molten bath.

The magnitude of pressure under which aluminum scraps are compressed is required to exceed the yield strength of the material making up the scraps. Especially, the pressure is desired to be 600 kg/cm$^2$ greater than the yield strength. If the pressure is not greater than the yield strength, then the aluminum scraps fail to form creeps and does not acquire an increased apparent specific gravity.

Figure 4:
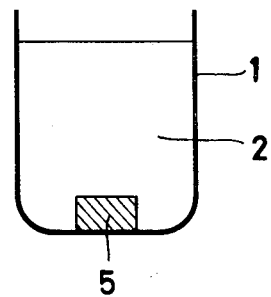
FIG. 4 and FIG. 5 are a schematic representation of the behavior of a compressed mass of aluminum scraps prepared and placed in the molten bath to be melted therein by the method of this invention.
Figure 5:
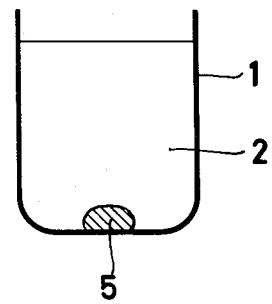

FIG. 4 and FIG. 5 show how a compressed mass of aluminum scraps prepared and placed in the molten bath by the method of this invention behaves immediately after its introduction into the molten bath and while it is in the process of being melted in the bath. In the drawing, 5 denotes a compressed mass. Normally, the compressed mass settles to the bottom of molten bath as illustrated, immediately after its introduction into the molten bath, there to be melted. Thus, the duration of the exposure of the aluminum scraps to the ambient air is minimized and, consequently, the melting loss is minimized.

The method of the present invention may appear to be similar to the conventional method which effects the required melting of new clippings of pure aluminum by pressing the scraps. However, the method of the present invention compresses the aluminum scraps for the purpose of increasing the apparent specific gravity of the scraps, whereas the conventional method presses the scraps solely for the purpose of decreasing the surface area of scraps. Thus, the conventional method sufficiently attains its object by pressing the scraps with a low pressure. In contrast, the method of this invention is required to convert aluminum scraps into a compressed mass and, for this purpose, it is absolutely necesary to compress the scraps under a magnitude of pressure greater than the yield strength of the scraps.

Specifically, the present invention has an object different from that of the conventional method which resides in decreasing the apparent surface area of scraps. Thus the two methods entirely differ from each other in terms of the magnitude of pressure exerted upon the aluminum scraps under treatment. The apparent maximum specific gravity of scraps after application of such pressure is only 1.6 in the case of the conventional method and as much as 2.35 or over in the case of the method of the present invention.

Now the effect of the present invention will be described with reference to working examples of this invention and comparison examples.

EXAMPLE 1

Turnings from aluminum slabs (having a composition of 0.45% of Fe, 0.18% of Si and the balance of Al, yield strength of 1000 to 1400 kg/cm$^2$ and apparent specific gravity of 0.35) were placed in a container 140 mm in diameter and compressed under a strength of 140 tons with a double-action type hydraulic press, to afford a compressed mass having a height of 85 mm, a weight of 3309 g and an apparent specific gravity of 2.53. The compressive strength used in this case was 1,400,000 kg$\div$(70$\times$70$\times$3.14)=91 kg/cm$^2$. About two tons of such compressed masses were melted in a molten bath within a 5-ton reverberatory furnace. The melting yield was 98.5%.

Comparison Example 1

About two tons of turnings from aluminum slabs identical with those used in Example 1 were placed, in their unaltered form, in a molten bath within a 5-ton reverberatory furnace to be melted therein by the liquid-heel process. The melting yield in this case was 94.2%.

Comparison Example 2

The same turnings from aluminum slabs as those used in Example 1 were compressed with a 60-ton press into a mass having a cross-sectional area of 300 mm$\times$400 mm so as to decrease the apparent surface area. The compressive strength was 60,000 kg$\div$(300$\times$400)=0.5 kg/mm$^2$ and the apparent specific gravity was 1.45. About two tons of the compressed mass was melted in the molten bath within a reverberatory furnace by following the procedure of Example 1. The melting yield in this case was 95.3%.

Comparison shows that the melting yield obtained in Example 1 was higher than that obtained in Comparison Example 1 or Comparison Example 2.

EXAMPLE 2

New clippings of pure aluminum having a thickness of about 0.5 mm (having a composition of 0.45% by weight of Fe, 0.18% by weight of Si and the balance of Al, a yield strength of 1200 to 1400 kg/cm$^2$ and an apparent specific gravity of 0.28 to 0.48) was compressed by a compressive force of 140 tons in much the same way as in Example 1, to afford a compressed mass having a height of 80 mm, a weight of 3139 g and an apparent specific gravity of 2.55. About two tons of such masses were melted in the molten bath within a 5-ton reverberatory furnace by faithfully repeating the procedure of Example 1. The melting yield in this case was 99.1%.

Comparison Example 3

About two tons of new clippings of pure aluminum identical with those used in Example 2 were placed in the molten bath within the same reverberatory furnace as used in Example 1 and melted by the liquid-heel process. The melting yield in this case was 95.2%.

Comparison Example 4

The same new clippings of pure aluminum as those of Example 2 were compressed with a 60-ton press into a mass having a cross-sectional area of 300 mm × 400 mm for the purpose of decreasing the surface area. The compressive force was 60000 kg ÷ (300 × 400) = 0.5 kg/mm$^2$ and the apparent specific gravity was 1.49. About two tons of such masses were placed within the reverberatory furnace and melted by repeating the procedure of Example 2. The melting yield in this case was 96.3%.

Comparison shows that the melting yield obtained in Example 2 was higher than that of Comparison Example 3 or Comparison Example 4. This clearly indicates the effectiveness of this invention.

EXAMPLE 3

Aluminum scraps 1000 mm in length and 0.3 to 1.5 mm in thickness (having a composition of 0.45% by weight of Fe, 0.18% by weight of Si and the balance of Al and a yield strength of 1000 to 1400 kg/cm$^2$) were subjected to the first shredding to produce compressed fragments about 300 mm in average diameter. Then, the shredded fragments were separated of extraneous particles such as paper and paint debris by gravity separation. The fragments were thereafter subjected to the second shredding into particles having an average particle diameter of 15 mm (with a particle size distribution such that particles having diameters up to 2 mm accounting for 5% by weight, those having diameters from 2 to 20 mm accounting for 95% by weight and those having diameters of 20 mm or over accounting for 5% by weight respectively). The particles were freed from iron particles by means of magnetic separation and, thereafter, compressed under a magnitude of pressure of 2000 kg/cm$^2$ with a double-action type press, to afford compressed masses. These compressed masses had an average weight of about 2 kg and a bulk density of 2.50. A total of 2300 compressed masses weighing 4600 kg were placed in a 5-ton reverberatory furnace and melted. The melting yield in this case was 97.6%.

Comparison Example 5

The same aluminum scraps as those of Example 3 were pressed, in their unaltered form, with a hydraulic press. The pressed masses were treated in the reverberatory furnace by faithfully following the procedure of Example 3. The melting yield in this case was 95.6%.

What is claimed is:

1. A method for the melting of aluminum scraps in a single molten aluminum bath which is open to the atmosphere, which method comprises shredding said aluminum scraps into particles most of which have maximum diameters of between 2 mm and 20 mm, removing from said particles paint, synthetic resin, paper and iron debris mingling therein, then compressing the resultant aluminum particles at ambient temperatures under a magnitude of pressure greater than the yield strength of aluminum into compressed masses having an apparent specific gravity of said molten aluminum bath, and subsequently introducing and melting said compressed masses in said molten aluminum bath.

2. The method according to claim 1, wherein the compressed masses have a length not greater than 140 mm.

3. The method according to claim 1, wherein the magnitude of pressure under which the compression is carried out is at least 600 kg/cm$^2$ higher than the yield strength of aluminum scraps.

4. The method according to claim 1, wherein the aluminum scraps are shredded into particles having a particle size distribution such that particles having maximum diameters exceeding 20 mm account for 3 to 7% by weight, those having maximum diameters of from 2 to 20 mm account for 88 to 92% by weight and those having maximum diameters up to 2 mm account for 3 to 7% by weight respectively.

* * * * *